United States Patent
Januario et al.

(10) Patent No.: US 9,916,678 B2
(45) Date of Patent: Mar. 13, 2018

(54) KERNEL CONVOLUTION FOR STENCIL COMPUTATION OPTIMIZATION

(71) Applicant: International Business Machines Corporation, Armonk, NY (US)

(72) Inventors: Guilherme C. Januario, Sao Paolo (BR); Yoonho Park, Chappaqua, NY (US); Bryan S. Rosenburg, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/670,756

(22) Filed: Aug. 7, 2017

(65) Prior Publication Data

US 2017/0358124 A1 Dec. 14, 2017

Related U.S. Application Data

(63) Continuation-in-part of application No. 14/986,194, filed on Dec. 31, 2015, now abandoned.

(51) Int. Cl.
G06F 17/15 (2006.01)
G06T 15/10 (2011.01)
G06T 15/00 (2011.01)
G06T 5/50 (2006.01)

(52) U.S. Cl.
CPC ............ G06T 15/10 (2013.01); G06T 15/005 (2013.01); *G06T 5/50* (2013.01); *G06T 2207/10004* (2013.01)

(58) Field of Classification Search
CPC .................................................. G06F 17/153
USPC ........................................................ 708/420
See application file for complete search history.

(56) References Cited

U.S. PATENT DOCUMENTS

| 6,999,531 B2 | 2/2006 | Jin |
| 2015/0066450 A1* | 3/2015 | Charlesworth ..... G06F 17/5009 703/2 |
| 2015/0086134 A1 | 3/2015 | Hameed et al. |

(Continued)

OTHER PUBLICATIONS

Wikipedia, "Convolution," Oct. 2015, 14 pages.
(Continued)

*Primary Examiner* — Tan V. Mai
(74) *Attorney, Agent, or Firm* — Daniel P. Morris; Ryan, Mason & Lewis, LLP

(57) ABSTRACT

Data processing techniques are provided to increase a computational speed of iterative computations that are performed over a domain of data points, such as stencil computations. For example, a method includes loading a set of domain data points into a cache memory; obtaining an iteration count T, and a base stencil operator having a first set of coefficients; generating a convolved stencil operator having a second set of coefficients, wherein the convolved stencil operator is generated by convolving the base stencil operator with itself at least one time; and iteratively processing the set of domain data points in the cache memory using the convolved stencil operator no more than T/2 iterations to obtain final processing results. The final processing results are similar to processing results that would be obtained by iteratively processing the set of domain data points using the base stencil operator for the iteration count T.

20 Claims, 9 Drawing Sheets

(56) References Cited

U.S. PATENT DOCUMENTS

2015/0192654 A1* 7/2015 Zhu .................... G01R 33/5611
324/309
2016/0147514 A1* 5/2016 Baskaran .............. G06F 8/4434
717/150

OTHER PUBLICATIONS

M. Bromley et al., "Fortran at Ten Gigaflops: The Connection Machine Convolution Compiler," Proceedings of the ACM SIGPLAN, Conference on Programming Language Design and Implementation (PLDI), Jun. 1991, pp. 145-156, Toronto, Ontario, Canada.

B. Lippmeier et al., "Efficient Parallel Stencil Convolution in Haskell," Proceedings of the 4th ACM Symposium on Haskell (Haskell), Sep. 2011, pp. 59-70, Tokyo, Japan.

X. Jin et al., "Implicit Modeling from Polygon Soup Using Convolution," The Visual Computer: International Journal of Computer Graphics, Feb. 2009, pp. 279-288, vol. 25, No. 3.

W. Warsito et al., "Neural Network Multi-Criteria Optimization Image Reconstruction Technique (NM-MOIRT) for Linear and Non-Linear Process Tomography," Chemical Engineering and Processing, Aug. 2003, pp. 663-674, vol. 42, No. 8.

V. Bandishti et al., "Tiling Stencil Computations to Maximize Parallelism," International Conference for High Performance Computing, Networking, Storage and Analysis (SC), Nov. 2012, pp. 1-11, Article No. 40.

M. Christen et al., "PATUS for Convenient High-Performance Stencils: Evaluation in Earthquake Simulations," International Conference for High Performance Computing, Networking, Storage and Analysis (SC), Nov. 2012. pp. 1-10, Article No. 11.

Y. Tang et al., "The Pochoir Stencil Compiler," Proceedings of the 23rd ACM Symposium on Parallelism in Algorithms and Architectures (SPAA), Jun. 2011, pp. 117-128.

D. Unat et al., "Mint: Realizing CUDA Performance in 3D Stencil Methods with Annotated C," Proceedings of the International Conference on Supercomputing (ICS), May-Jun. 2011, pp. 214-224.

N. Maruyama et al., "Physis: An Implicity Parallel Programming Model for Stencil Computations on Large-Scale GPU-Accelerated Supercomputers," International Conference for High Performance Computing, Networking, Storage and Analysis (SC), Nov. 2011, pp. 1-12, Article No. 11.

K. Datta et al., "Stencil Computation Optimization and Auto-Tuning on State-of-the-art Multicore Architectures," International Conference for High Performance Computing, Networking, Storage and Analysis (SC), Nov. 2008, pp. 1-12, Article No. 4.

List of IBM Patents or Patent Applications Treated as Related.

* cited by examiner

FIG. 1A $100$

| $k_1$ | $k_0$ | $k_1$ |

$110 \Big\{ X_{i,t+1} = \varphi(X_{i-1,t}, X_{i,t}, X_{i+1,t}) = k_1 X_{i-1,t} + k_0 X_{i,t} + k_1 X_{i+1,t}$

FIG. 1B $120$

| $e_2$ | $e_1$ | $e_0$ | $e_1$ | $e_2$ |

$130 \begin{cases} e_0 \equiv k_0^2 + 2k_1^2 \\ e_1 \equiv 2k_0 k_1 \\ e_2 \equiv k_1^2 \end{cases}$ $140 \Big\{ X_{i,t+2} = \omega(X_{i-2,t}, X_{i-1,t}, X_{i,t}, X_{i+1,t}, X_{i+2,t}) = e_0 X_{i,t} + e_1(X_{i-1,t} + X_{i+1,t}) + e_2(X_{i-2,t} + X_{i+2,t})$ Table II

| D | Radius | RIS | FLOPs | Straightforward FLOPs | FLOPs Ratio | Cache Reads | Arithmetic Intensity | Operational Intensity | Machine 1 Peak DP (Gflops/s): 75 Bandwidth (GB/s): 5.9 | | | Machine 2 Peak DP (Gflops/s): 74 Bandwidth (GB/s): 16.6 | | |
|---|---|---|---|---|---|---|---|---|---|---|---|---|---|---|
| | | | | | | | | | Roofline | Speed-Up Achievable | | Roofline | Speed-Up Achievable | |
| 1 | 1 | 1 | 4 | 4 | 1 | 3 | 0.17 | 0.25 | 1.48 | 1 | | 4.15 | 1 | |
| | | 1 | 4 | 4 | 1 | 1 | 0.5 | 0.25 | 1.48 | 1 | | 4.15 | 1 | |
| | | 2 | 7 | 8 | 1.14 | 1 | 0.88 | 0.44 | 2.58 | 2 | | 7.26 | 2 | |
| | | 3 | 10 | 12 | 1.2 | 1 | 1.25 | 0.63 | 3.69 | 3 | | 10.38 | 3 | |
| | | 20 | 61 | 80 | 1.31 | 1 | 7.63 | 3.81 | 22.49 | 20 | | 63.29 | 20 | |
| | 2 | 1 | 7 | 7 | 1 | 5 | 0.18 | 0.44 | 2.58 | 1 | | 7.26 | 1 | |
| | | 2 | 13 | 14 | 1.08 | 1 | 1.63 | 0.81 | 4.79 | 2 | | 13.49 | 2 | |
| | | 3 | 19 | 21 | 1.11 | 1 | 2.38 | 1.19 | 7.01 | 3 | | 19.71 | 3 | |
| | | 12 | 74 | 84 | 1.15 | 1 | 9.13 | 4.56 | 26.92 | 12 | | 74 | 11.72 | |
| 2 | 1 | 1 | 6 | 6 | 1 | 5 | 0.15 | 0.38 | 2.21 | 1 | | 6.23 | 1 | |
| | | 2 | 15 | 12 | 0.8 | 5 | 0.38 | 0.94 | 5.53 | 2 | | 15.56 | 2 | |
| | | 3 | 26 | 18 | 0.69 | 7 | 0.46 | 1.63 | 9.59 | 3 | | 26.98 | 3 | |
| 3 | 1 | 1 | 8 | 8 | 1 | 7 | 0.14 | 0.5 | 2.95 | 1 | | 8.3 | 1 | |
| | | 2 | 24 | 16 | 0.67 | 13 | 0.23 | 1.5 | 8.85 | 2 | | 24.9 | 2 | |

KERNEL CONVOLUTION FOR STENCIL COMPUTATION OPTIMIZATION

TECHNICAL FIELD

This disclosure relates generally to data processing and, in particular, to systems and methods for implementing stencil computations.

BACKGROUND

Stencil computation techniques are implemented in various scientific applications, ranging from image processing and geometric modeling to solving partial differential equations through finite-difference methods, and in seismic modeling which is common in oil-industry practices. Stencil computations are also utilized in the game-of-life and in the pricing of American put stock options. In a stencil computation, the values of a set of domain points are iteratively updated with a function of recent values of neighboring points. An outermost loop in a stencil kernel is always an iteration through the time domain, sometimes for tens of thousands of time steps, wherein the values of the last iteration are the desired results of the stencil computation. Most often, the domain is represented by a rectilinear grid or an equivalent Cartesian description. It can be regarded as a matrix multiplication, updating the value of an element usually with a sum of products or with a sum of products of sums, if the symmetry allows. Another property of stencil operators, commonly found in the literature and in practice, is that the stencil operator, comprised by the structure of the neighborhood and coefficients applied to each neighbor, is the same for all domain points. In this regard, stencil computations diverge from, for example, multi-grid methods.

The importance and ubiquity of stencil computations has resulted in the development of special-purpose compilers, a trend that has its counterpart in current efforts to develop auto-tuners and compilers. It is known that stencil-codes usually perform poorly, relative to peak floating-point performance. Stencils must be handled efficiently to extract high performance from distributed machines. All of these activities confirm the need for stencil computation optimization. Conventional techniques for optimizing stencil computations have focused on applying new technologies (such as SIMD (single instruction multiple data) and cache-by-pass), improving data alignment in memory, improving task division in and among processor cores, and using time-skewing and cache-oblivious algorithms.

SUMMARY

Embodiments of the invention generally include data processing techniques that are configured to increase a computational speed of iterative computations that are performed over a domain of data points, such as stencil computations. For example, one embodiment of the invention is a method which includes: loading a set of domain data points into a cache memory, wherein the set of domain points comprises N data points; obtaining an iteration count T, and a first data structure comprising a base stencil operator having a first set of coefficients, which are associated with the set of domain data points loaded into the cache memory; generating a second data structure comprising a convolved stencil operator having a second set of coefficients, wherein the convolved stencil operator is obtained by convolving the base stencil operator with itself at least one time; and iteratively processing, by a processor, the set of domain data points in the cache memory using the convolved stencil operator no more than T/2 iterations to obtain final processing results. The final processing results that are obtained are similar to processing results that would be obtained by iteratively processing the set of domain data points in the cache memory using the base stencil operator for the iteration count T.

Other embodiments will be described in the following detailed description of embodiments, which is to be read in conjunction with the accompanying figures.

BRIEF DESCRIPTION OF THE DRAWINGS

FIG. 1A illustrates a 1D, 3-point base stencil operator and a method for computing values of domain points using the 1D, 3-point base stencil operator.

FIG. 1B illustrates a convolved stencil operator that is derived from the 1D, 3-point base stencil operator of FIG. 1A, and a method for computing values of domain points using the convolved stencil operator, according to an embodiment of the invention.

FIG. 10 illustrates a table with information that represents straightforward and ASLI versions of stencil kernels according to an embodiment of the invention.

DETAILED DESCRIPTION OF EMBODIMENTS

Figure 2B:
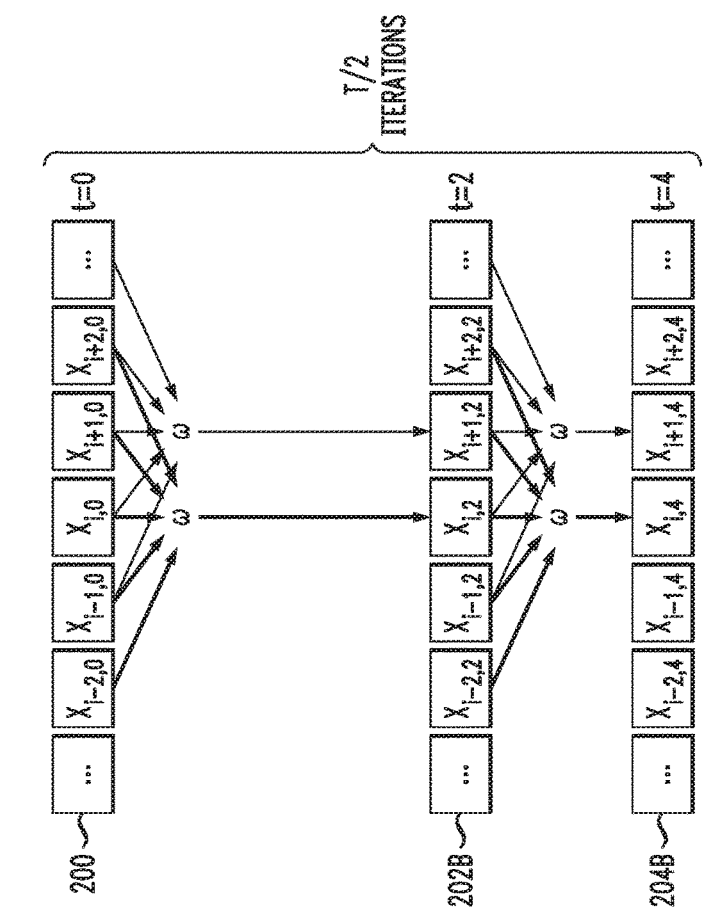
FIGS. 2A and 2B schematically illustrate a comparison between stencil computations that are performed on a set of domain points using a base stencil operator $\phi$, and stencil computations that are performed on the same set of domain points using a convolved stencil operator $\omega$ derived from the base stencil operator $\phi$, according to an embodiment of the invention.

Embodiments will now be discussed in further detail with regard to data processing systems and methods that are configured to increase a computational speed of iterative computations which are performed over a domain of data points, such as stencil computations. In particular, embodiments of the invention as described herein provide systems and methods for optimizing stencil computations using kernel convolution techniques which are data-centric and designed to exploit in-register data reuse. For ease of reference, we generally refer to computational techniques discussed herein as ASLI (Aggregate Stencil-Like Iteration)

techniques, which can be considered an application of kernel convolution (KC) in the context of stencil computation.

As explained in further detail below, in contrast to a conventional stencil computation technique which traverses a set of domain points for an interaction count T (i.e., T iterations) and applies a given stencil operator to every point, an ASLI process according to an embodiment of the invention takes as input a desired RIS (Reduction in Iteration Space) parameter, and traverses the set of domain points for T/RIS iterations, applying a new operator that is obtained by convolving an original operator with itself RIS−1 times. The ASLI process results in traversing the set of domain points less times (than the conventional iterative stencil implementation), with each traversal performing more computations per data item loaded into memory (e.g., fetched into registers) than conventional stencil implementations. In this regard, ASLI processing techniques according to embodiments of the invention are configured to increase the speed of computations that are performed iteratively over a set of domain data points, such as stencil computations. The ASLI protocol yields final processing results for a given set of domain points, wherein the final processing results are mathematically equivalent to processing results that would otherwise be obtained by iteratively processing the given set of domain points using the base stencil operator for the iteration count T, but which may slightly diverge due to differences in rounding errors.

The use of a convolved operator according to an embodiment of the invention creates new opportunities for in-register data reuse and increases the FLOPs-to-load ratio. For 2D and 3D star-shaped stencil operators, while a total number of FLOPs may increase, the optimized interaction with a memory subsystem and new possibilities for better exploitation of SIMD operations renders the ASLI techniques more beneficial as compared to even highly optimized conventional implementations. ASLI techniques according to embodiments of the invention are relatively easy to implement, allowing more scientists to extract better performance from their supercomputing clusters. ASLI techniques discussed herein are complementary to other methods for improving stencil computation performance that have been developed.

Embodiments of the invention will now be discussed in further detail below with reference to star-shaped stencils of radius 1 including, for example, 1D, 3-point stencils, 2D, 5-point stencils, and 3D, 7-point stencils. We also analyze ASLI techniques for higher-order 1D and 2D cases, even when the stencil operator has asymmetric coefficients. The following example embodiment illustrates a formulation of an ASLI method based on a symmetric, 1D, 3-point stencil operator, which is applied to a set of domain points.

In the following formulation, it is assumed that a set of domain points is uni-dimensional and comprised of N points, each identified as $X_i$, where $0 \leq i < N$. For each iteration step and for every point, the stencil computation takes as input the values associated with three neighboring points as computed in a preceding step, which is typical of stencil computations, where the dimensionality commonly varies from 1 to 3. The following example provides an abstract description of a computation that iteratively updates the values associated with the domain points, according to an embodiment of the invention. A first step involves identifying a single-time-step base formula as follows: $X_{i,t+1} = \phi(X_{i-1,t}, X_{i,t}, X_{i+1,t})$, where $\phi$ denotes a base stencil operator, which is applied to the values associated with three neighboring points $X_{i-1,t}, X_{i,t}, X_{i+1,t}$ as computed in a preceding iteration T=t, to compute the value for $X_i$ for the current iteration T=t+1.

A two-time-step formula can be derived by applying the base formula recursively, as follows:

$$X_{i,t+2} = \phi(X_{i-1,t+1}, X_{i,t+1}, X_{i+1,t+1}) = \phi(\phi(X_{i-2,t}, X_{i-1,t}, X_{i,t}), \phi(X_{i-1,t}, X_{i,t}, X_{i+1,t}), \phi(X_{i,t}, X_{i+1,t}, X_{i+2,t}))$$

Next, we define a function ω (a convolved, two-time-step formula) which depends only on values at iteration time t, and not at iteration time t+1:

$$X_{i,t+2} = \omega(X_{i-2,t}, X_{i-1,t}, X_{i,t}, X_{i+1,t}, X_{i+2,t})$$

where $$\omega(X_{i-2,t}, X_{i-1,t}, X_{i,t}, X_{i+1,t}, X_{i+2,t}) = \phi(\phi(X_{i-2,t}, X_{i-1,t}, X_{i,t}), \phi(X_{i-1,t}, X_{i,t}, X_{i+1,t}), \phi(X_{i,t}, X_{i+1,t}, X_{i+2,t})).$$

The following illustrates a more concrete implementation of the above formulation as applied to a 3-point 1-D stencil through T iterations. To optimize the stencil computation, in the following example, we seek to obtain the values after T time steps of simulation, while only performing one-half of the iterations through the domain of data points. That is, the desired RIS (Reduction of the Iteration Space) is by a factor of 2 ("RIS by two"). The following steps are evaluated in accordance with the more abstract description discussed above.

As a first step, assume the base formula $X_{i,t+1} = \phi(X_{i-1,t}, X_{i+1,t})$ has the form $k_1 X_{i-1,t} + k_0 X_{i,t} + k_1 X_{i+1,t}$, where $k_0$ and $k_1$ are constants of a 3-point 1-D stencil 100 as shown in FIG. 1. A next step is to derive ω(.) which is a convolved, two-time-step formula. In one embodiment of the invention, ω(.) is defined as follows:

$$\omega(X_{j-2,t}, X_{j-1,t}, X_{i,t}, X_{j+1,t}, X_{j+2,t})$$

$$= \rho(\phi(X_{i-2,t}, X_{i+1,t}, X_{i,t}), \phi(X_{i-1,t}, X_{i,t}, X_{i+1,t}), \phi(X_{i,t}, X_{i+1,t}, X_{i+2,t}))$$

$$= k_1 * \phi(X_{i-2,t}, X_{i-1,t}, X_{i,t}) + k_0 * \phi(X_{i-1,t}, X_{i,t}, X_{i+1,t}) + k_1 * \phi(X_{i,t}, X_{i+1,t}, X_{i+2,t})$$

$$= k_1 * [k_1 X_{i-2,t} + k_0 X_{i-1,t} + k_1 X_{i,t}] + k_0 * [k_1 X_{i-1,t} + k_0 X_{i,t} + k_1 X_{i+1,t}] + k_1 * [k_1 X_{i,t} + k_0 X_{i+1,t} + k_1 X_{i+2,t}].$$

In a next step, with reordering and algebraic manipulation we obtain:

$$\omega(X_{i-2,t}, X_{i-1,t}, X_{i,t}, X_{i+2,t}) = [(k_0^2 + 2k_1^2) * X_{i,t}] + [(2k_0 k_1) * (X_{i-1,t} + X_{i+1,t})] + [k_1^2 * (X_{i-2,t} + X_{i+2,t})].$$

Based on the above, we can express a formula to compute $X_{i,t+2}$ which depends only on (new) constants and values at iteration time step t, not at iteration time step t+1, as follows:

$$X_{1,t+2} = \omega(X_{i-2,t}, X_{i-1,t}, X_{i,t}, X_{1+1,t}, X_{i+2,t}) = e_0 * X_{i,t} + e_1 * (X_{i-1,t} + X_{i+1,t}) + e_2 * (X_{i-2,t} + X_{i+2,t}),$$

where: $e_0 \equiv k_0^2 + 2k_1^2$, $e_1 \equiv 2k_0 k_1$, and $e_2 \equiv k_1^2$.

An embodiment of the invention implements the computation of ω(.) instead of the computation of the base formula as in a conventional stencil implementation. In particular, with a conventional stencil implementation, the new values of the domain points for time T=t+2 are calculated during a pass through of the same domain points. An example 1D, 3-point stencil operator 100 as shown in FIG. 1A comprises coefficients $k_0$ and $k_1$. Example values for the domain points for time T=t+2 are shown in Equation (1) below, wherein it is assumed that the values for time T=t+1 are calculated during a previous pass through of the domain points using values for time T=t. The following Equations (1)-(4) summarize the formulas used in these two sweeps through the stencil domain, based on the stencil operator 100 shown in FIG. 1:

$$X_{i,t+2} = \phi(X_{i-1,t+1}, X_{i,t+1}, X_{i+1,t+1}) = k_1 X_{i-1,t+1} + k_0 X_{i,t+1} + k_1 X_{i+1,t+1} \quad (1)$$

$$X_{i-1,t+1} = k_1 X_{i-2,t} + k_0 X_{i-1,t} + k_1 X_{i,t} \quad (2)$$

$$X_{i,t+1} = k_1 X_{i-1,t} + k_0 X_{i,t} + k_1 X_{i+1,t} \quad (3)$$

$$X_{i+1,t+1} = k_1 X_{i,t} + k_0 X_{i+1,t} + k_1 X_{i+2,t} \quad (4)$$

FIG. 1A also depicts an example computation 110 for $X_{i,t+1}$ by applying the coefficients $k_1$, $k_0$, $k_1$ of the conventional stencil operator 100 to the previous computed domain points $X_{i-1,t}$, $X_{i,t}$, and $X_{i+1,t}$, respectively. Equations (1)-(4) are combined to derive the following Equation (5):

$$X_{i,t+2} = \omega(X_{i-2,t}, X_{i-1,t}, X_{i,t}, X_{i+1,t}, X_{i+2,t}) = e_0 X_{i,t} + e_1(X_{i-1,t} + X_{i+1,t}) + e_2(X_{i-2,t} + X_{i+2,t}) \quad (5)$$

Equation (5) provides a formula to compute a domain value at time step T=t+2 as a function of the previously computed domain values at time step T=t based on coefficients $e_0$, $e_1$, and $e_2$ of a convolved stencil operator 120, as shown in FIG. 1B. For illustrative purposes, FIG. 1B further depicts a set of values 130 for the coefficients $e_0$, $e_1$, and $e_2$ of the convolved stencil operator 120, which are based on the values of the coefficients $k_1$, $k_0$, $k_1$ of the conventional stencil operator 100 shown in FIG. 1A. As further depicted in FIG. 1B, a computation 140 of $X_{i,t+2}$ is based on computed values of the domain points at time step T=t, which computation does not rely on computed values of the domain points at time step T=t+1. In particular, based on the convolved stencil operator 120 shown in FIG. 1B, the value for the domain point $X_{i,t+2}$ can be computed by applying the values 130 of stencil coefficients $e_2$, $e_1$, $e_0$, $e_1$, $e_2$ to the previous computed domain points $X_{i-2,t}$, $X_{i-1,t}$, $X_{i,t}$, $X_{i+1,t}$, $X_{i+2,t}$, respectively, at time step T=t.

Figure 2A:
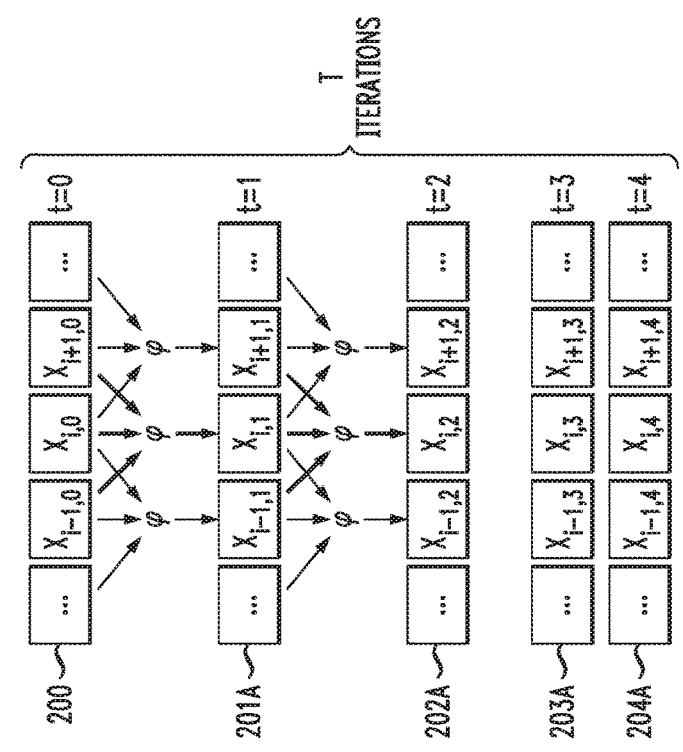

FIGS. 2A and 2B schematically illustrate a comparison between stencil computations that are performed on a set of domain points using a base stencil operator $\phi$, and stencil computations that are performed on the same set of domain points using a convolved stencil operator $\omega$ derived from the base stencil operator $\phi$, according to an embodiment of the invention. In particular, FIG. 2A schematically illustrates an initial set of domain points 200 ( . . . , $X_{i-1,0}$, $X_{i,0}$, $X_{i+1,0}$, . . . ) at time step t=0, which are loaded in a first memory region of a memory. FIG. 2A further illustrates four time step iterations of stencil computations that are performed on the data points at time steps t=1, t=2, t=3 and t=4 using the base stencil operator $\phi$.

More specifically, as shown in FIG. 2A, a first iteration (t=1) of stencil computations is performed on the initial set of domain points 200 using the base stencil operator $\phi$ to generate a first set of computed domain points 201A. A second iteration (t=2) of stencil computations is performed on the first set of computed domain points 201A using the base stencil operator $\phi$ to generate a second set of computed domain points 202A. A third iteration (t=3) of stencil computations is performed on the second set of computed domain points 202A using the base stencil operator $\phi$ to generate a third set of computed domain points 203A. A fourth iteration (t=4) of stencil computations is performed on the third set of computed domain points 203A using the base stencil operator $\phi$ to generate a fourth set of computed domain points 204A. In the example embodiment of FIG. 2A, the set of domain points 200, 202A, and 204A are stored in a first region of system memory (e.g., a first region of a system RAM), while the set of domain points 201A and 203A are stored in a second region of system memory (e.g., a second region of the system RAM).

The stencil computations shown in FIG. 2A can be implemented using the base stencil operator 100 shown in FIG. 1A, which results in the example stencil computation 110 shown in FIG. 1A, which utilizes three data points. For example, in the example illustration of FIG. 2A, the domain point $X_{i,1}$ (of the first set of computed domain points 201A) can be computed by applying the coefficients $k_1$, $k_0$, $k_1$ of the base stencil operator 100 (e.g., base stencil operator $\phi$) to the respective data points $X_{i-1,0}$, $X_{i,0}$, $X_{i+1,0}$ of the initial set of domain data points 200. Similarly, the domain point $X_{i,2}$ (of the second set of computed domain points 202A) can be computed by applying the coefficients $k_1$, $k_0$, $k_1$ of the base stencil operator 100 (e.g., base stencil operator $\phi$) to the respective data points $X_{i-1,1}$, $X_{i,1}$, $X_{i+1,1}$ of the first set of computed domain points 201A. The other domain points in the respective sets of computed domain points 201A, 202A, 203A, 204A, etc., are computed in the same manner using the coefficients $k_1$, $k_0$, $k_1$ of the base stencil operator 100.

Next, in accordance with an embodiment of the invention, FIG. 2B schematically illustrates an ASLI process that emulates the conventional process of FIG. 2A but with one-half the iterations. In particular, the method of FIG. 2B starts with the same initial set of domain points 200 ( . . . , $X_{i-1,0}$, $X_{i,0}$, $X_{i+1,0}$, . . . ) at time step t=0. FIG. 2B further illustrates two time-step iterations of stencil computations that are performed on the data points at time steps t=2 and t=4 (as opposed to the four time-step iterations of FIG. 2A) using the convolved stencil operator $\omega$, which is derived from the base stencil operator $\phi$).

More specifically, as shown in FIG. 2B, a first iteration (t=2) of stencil computations is performed on the initial set of domain points 200 using the convolved stencil operator $\omega$ to generate a first set of computed domain points 202B. A second iteration (t=4) of stencil computations is performed on the first set of computed domain points 202B using the convolved stencil operator $\omega$ to generate a second set of computed domain points 204A. In the example embodiment of FIG. 2A, the set of domain points 200 and 204B are stored in a first region of system memory (e.g., a first region of a system RAM), while the set of domain points 202B are stored in a second region of system memory (e.g., a second region of the system RAM).

The stencil computations shown in FIG. 2B can be implemented using the convolved stencil operator 120 shown in FIG. 1B, which results in the example stencil computation 140 shown in FIG. 1B, which utilizes five data points. For example, in the example illustration of FIG. 2B, the domain point $X_{i,2}$ (of the first set of computed domain points 202B) can be computed by applying the coefficients $e_2$, $e_1$, $e_0$, $e_1$, $e_2$ of the convolved stencil operator 120 (e.g., convolved stencil operator $\omega$) to the domain data points $X_{i-2,0}$, $X_{i-1,0}$, $X_{i,0}$, $X_{j+1,0}$, $X_{j+2,0}$, respectively, of the initial set of domain data points 200. Similarly, the domain point $X_{i,4}$ (of the second set of computed domain points 204B) can be computed by applying the coefficients $e_2$, $e_1$, $e_0$, $e_1$, $e_2$ of the convolved stencil operator 120 to the domain data points $X_{i-2,2}$, $X_{i-1,2}$, $X_{1,2}$, $X_{j+1,2}$, $X_{j+2,2}$, respectively, of the first set of computed domain points 202B. The other domain points in the respective sets of computed domain points 202B, 204B, etc., are computed in the same manner using the coefficients $e_2$, $e_1$, $e_0$, $e_1$, $e_2$ of the convolved stencil operator 120.

The example ASLI process which is schematically shown in FIG. 2B, and which is based on Equation (5) as discussed above, performs stencil computations essentially by computing two time-step iterations with a single pass through the domain data using three coefficients ($e_0$, $e_1$, and $e_2$) and the knowledge 5 previous points for each computation. In contrast, the conventional process schematically shown in FIG. 2A requires double the number of iterations through the domain data using two coefficients ($k_0$ and $k_1$) and the knowledge 3 previous points for each computation. While the example ASLI process of FIG. 2B, for example, may appear to require more memory loads and higher overall time lost to memory latency (as compared to the stencil computation process of FIG. 2A), there are several aspects that favor the ASLI process. For example, the process in FIG. 2B to compute $X_{i,2}$ requires 5 memory loads (5 loads for one iteration), while the process in FIG. 2A to compute $X_{i,2}$ requires 6 memory loads (3 loads for each of the two iterations).

In addition, the ASLI process provides more intermediate products that can be reused. For example, the product $e_2 * X_{i+2,t}$ which is used to compute $X_{i,t+2}$ is also used to compute $X_{i+4,t+2}$. In a 1D case, the computation that can be reused is that of a point. As explained in further detail below, for 2D and 3D stencil computations, line and surface computations, respectively, are reusable.

Figure 3:
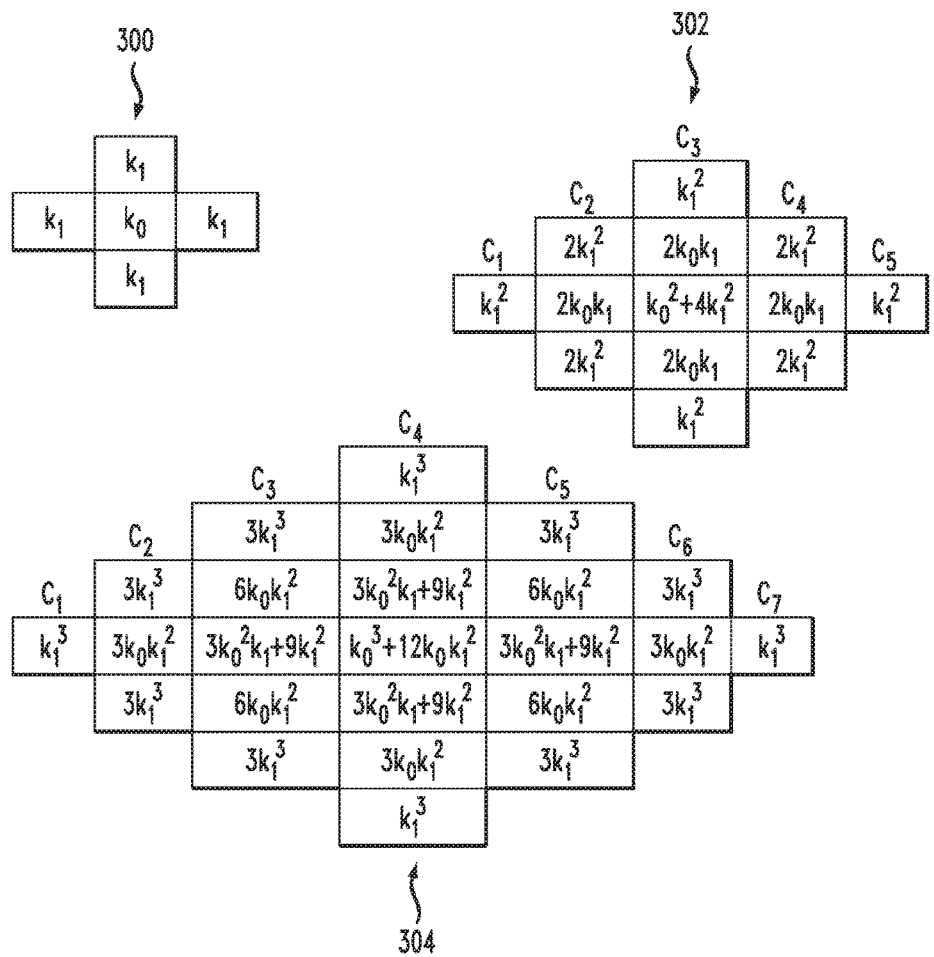
FIG. 3 depicts convolved versions of a symmetric stencil operator, according to embodiments of the invention.

FIG. 3 depicts convolved versions of a symmetric stencil operator, according to embodiments of the invention. In particular, FIG. 3 shows a symmetric 2D, 5-point stencil operator 300 ($O^1$), a convolved stencil operator 302 ($O^2$) which is derived by the convolution of $O^1$ with itself 1 time (RIS=2), and a convolved stencil operator 304 ($O^3$) which is derived by the convolution of $O^1$ with itself 2 times (RIS=3). The symmetric stencil operator 300 comprises two coefficients $k_0$, $k_1$ arranged in a star pattern. As further shown in FIG. 3, the coefficients of the convolved operators 302 and 304 comprise a set of values that are derived from the two coefficients $k_0$, $k_1$ of the symmetric stencil operator 300. In addition, FIG. 3 shows that each convolved stencil operator 302 and 304 has symmetry with respect to its associated coefficients.

For example, columns of coefficients on the right sides of the convolved operators 302 and 304 are the same as columns of coefficients on the left sides of the convolved operators 302 and 304. In particular, columns C1/C5 and columns C2/C4 of the convolved stencil operator 302 have the same coefficient values. Moreover, columns C1/C7, C2/C6, and C3/C5 of the convolved stencil operator 304 have the same coefficient values. Similar symmetry is shown for upper and lower rows of coefficients of the convolved operators 302 and 304. This property allows for computation reuse of entire columns within a given one convolved stencil operator as a computation wave front moves, e.g., to the right. This property occurs because the symmetric stencil operator 300 ($O^1$) is star-shaped, and is not a consequence of the particular coefficients that are chosen.

Figure 4:
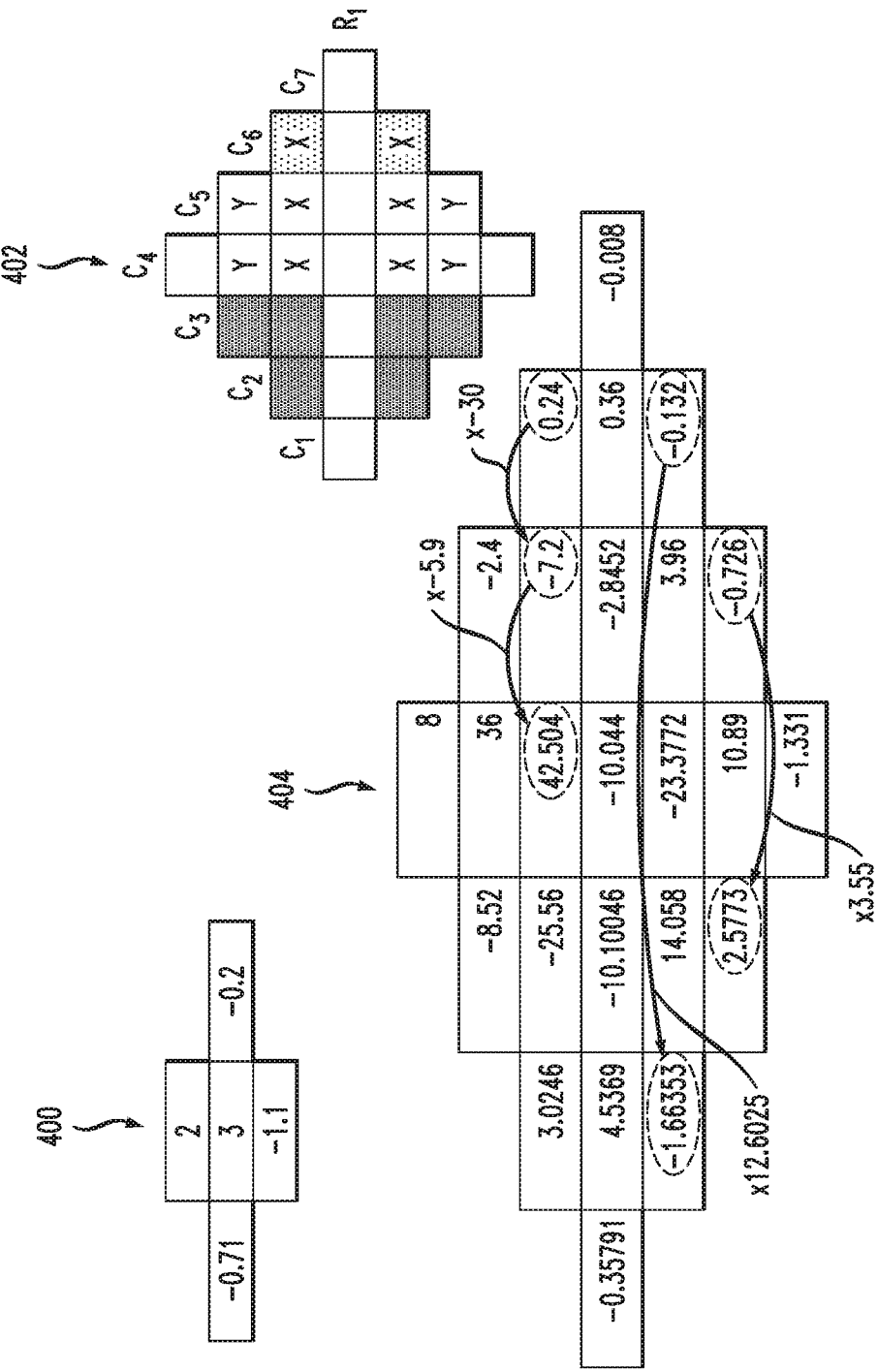
FIG. 4 depicts convolved versions of an asymmetric stencil operator, according to embodiments of the invention.

In another embodiment of the invention, ASLI techniques according to embodiments of the invention can be applied to asymmetric stencil operators. For example, FIG. 4 depicts a convolved version of an asymmetric stencil operator, according to an embodiment of the invention. In particular, FIG. 4 shows an asymmetric 2D, 5-point stencil operator 400 ($O^1$) and a convolved stencil operator 402 ($O^3$) which is derived by the convolution of $O^1$ with itself 2 times (RIS=3). In addition, FIG. 4 shows example coefficient values a convolved stencil operator 404 ($O^3$) based on the coefficient values of the asymmetric stencil operator 400 ($O^1$). The asymmetric stencil operator 400 comprises five different coefficients arranged in a star pattern.

FIG. 4 further illustrates that reuse exists for asymmetric operators. This property occurs because the asymmetric stencil operator 400 ($O^1$) is star-shaped, and is not a consequence of the particular coefficients that are chosen. For example, with the convolved stencil operator 402 ($O^3$) shown in FIG. 4, except for axial coefficients along row R1, the coefficients in columns C2 and C6 are multiples of each other, and the coefficients in columns C3 and C5 are multiples of each other. In asymmetric cases, the computations of the coefficients along the axes (column C4 and row R1) offer no reuse.

Moreover, computation can also be reused while composing columns. For example, both elements of pairs marked with X or Y in a column are a multiple, by the same factor, of the corresponding pair of any other column. This computational property is illustrated by the coefficient values and multiplication values shown in the convolved stencil operator 404. Pair-wise reuse to compose columns will be explained in further detail below.

Influence Tables for Algorithm Designers

The computation of convolved operators is not always straightforward. To address this issue, we introduce the concept of an Influence Table (I.T.). An Influence Table is a tool that a programmer can utilized to analyze the geometry and the coefficients of convolved operators. Similarly, a dedicated compiler could use I.T.'s instead of operating with symbolic logic. Finally, it allows researchers to explore convolution in other applications and neighborhoods.

Proposition 1:

It is possible to isolate the contribution of the value $X_{q,t}$ of any point q at time-step T=t to the value $X_{m,t+RIS}$ of any point m at time-step T=t+RIS. A proof for this proposition for RIS=2 is as follows. First, consider a stencil operator $O^1$ (called "base operator" or "operator of RIS=1") comprised of coefficients $c_\delta$, for every displacement vector $\delta = m-n$ that exists between any pair of domain points represented by the coordinate tuples m and n. When applied to the domain at time T=t, $O^1$ yields the value $X_{m,t+1} = \Sigma_p c_{p-m} X_{p,t}$, $\forall_{m,p}$ in the domain. We can now prove the claimed isolation for RIS=2 as follows.

By the definition of the stencil operator, $X_{m,t+2} = \Sigma_p c_{p-m} X_{p,t+1}$, $\forall_{m,p}$ in the domain D. Expressing $X_{p,t+1}$ as a function of the values at T=t, it becomes:

$$X_{m,t+2} = \Sigma_p c_{p-m} (\Sigma_q c_{q-p} X_{q,t}) \quad (6)$$

$$X_{m,t+2} = \Sigma_p \Sigma_q c_{p-m} c_{q-p} X_{q,t} \quad (7)$$

$$X_{m,t+2} = \Sigma_q (\Sigma_p c_{p-m} c_{q-p}) X_{q,t} \quad (8)$$

Thus the contribution of any $X_{q,t}$ to $X_{m,t+2}$ can be isolated if we consider the convolved coefficients $e_\delta$:

$$X_{m,t+2} = \Sigma_q e_{q-m} X_{q,t} \quad (9), \text{where}$$

$$e_{q-m} \equiv \Sigma_p c_{p-m} c_{q-p} \quad (10).$$

Corollary 1:

If at time T=t a given domain point m has value $X_{m,t} \neq 0$ and every other point has value 0, then the value $X_{p,t+RIS}$ of any point p, m inclusive, at time T=t+RIS is only dependent at time T=t on the value $X_{m,t}$. Therefore, $X_{p,t+RIS} = e_{m-p} X_{m,t}$, where $e_{m-p}$ denotes the coefficient $c_{m-p}$ of the operator $O^{RIS}$, which is obtained by the convolution of degree RIS of $O^1$. A convolution of degree 1 is defined as resulting in the same operator $O^1$. This corollary 1 is a direct consequence of our definitions and stems from the fact that the values that change at time T=t+1 result from a direct influence of m, the only point with non-null value a time T=t. The values at time T=t+2 result from the direct influence of the values that had previously suffered direct influence from the point m and up to T=t+MS.

Corollary 1B:

If $X_{m,t}=0$ and $X_{p,t}=0$, $\forall p \neq m$, then the values of the domain points at time T=t+RIS represent the operator $O^{RIS}$, flipped in every dimension and centered at m (i.e., with $X_{m,t+RIS}=e_0$). To understand this corollary 1B, first note that in this scenario $X_{m,t}=1$ implies through Corollary 1 that $X_{p,t+RIS}=e_{m-p}$, $\forall p$, m inclusive. Consider a point q and a displacement vector ρ such that q=m−ρ. Then, by the implication above, $X_{q,t+RIS}=X_{m-\rho,t+RIS}=e_{m-(m-\rho)}=e_\rho$. By definition (Equation 9), when applying the operator $O^{RIS}$ to m at time T=t, $e_p$ is the coefficient that should be applied to the point g for which g−m=ρ. That is, the current value of point q=m−ρ is the coefficient that should be applied to point g=m+ρ when the operator $O^{RIS}$ is applied to m. In other words, the current values of domain points represent the convolved stencil operator $O^{RIS}$, centered at m and flipped in every dimension, which enables one to obtain the values at time T=t+MS straight from the values at time T=t, skipping the explicit computation of values at any intermediate time-step t<ts<t+RIS.

Influence Table Exemplified for 2D Asymmetric Stencil

Figure 5:
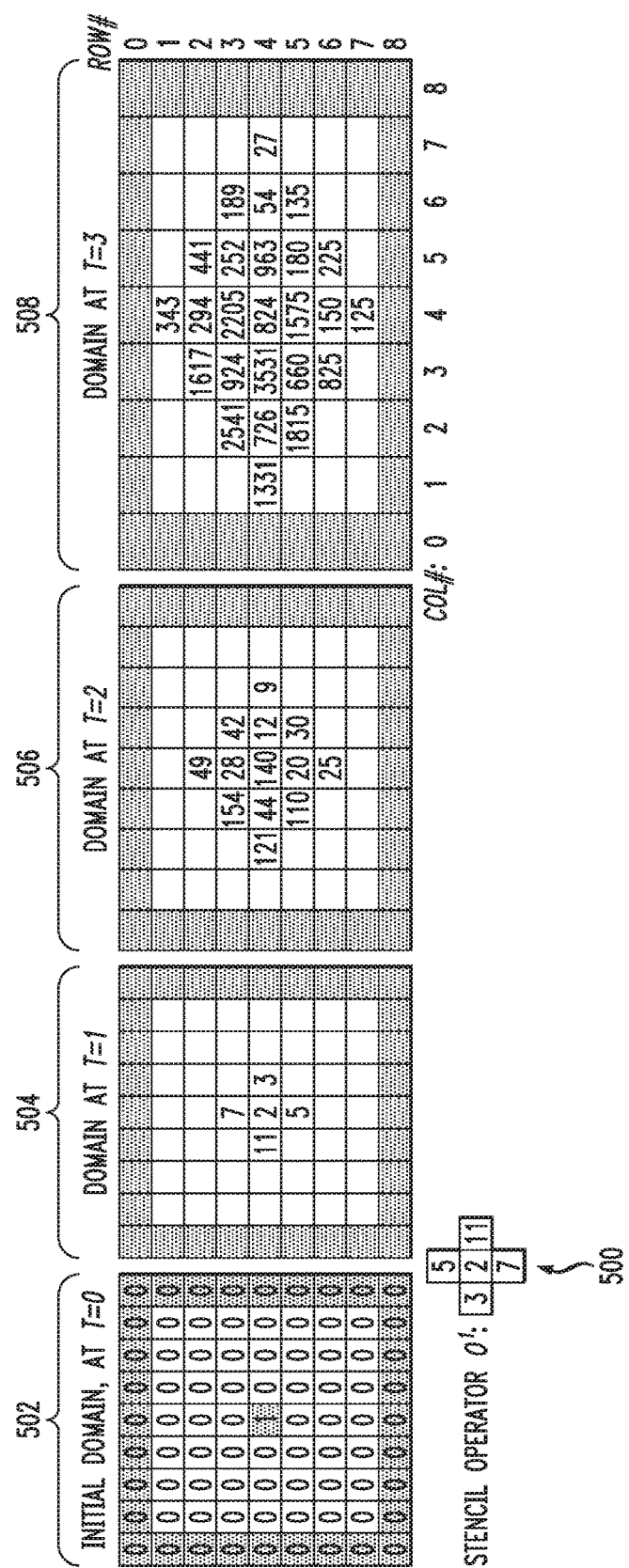
FIG. 5 illustrates a plurality of influence tables relative to Reduction in Iteration Space (RIS)=1, 2, and 3 for an example asymmetric, 5-point 2D stencil operator, according to an embodiment of the invention.

In one embodiment of the invention, the above proposition 1 and corollary 1B comprise a basis of an Influence Table, as explained below. An Influence Table is a useful method to calculate the coefficients of convolved operators and can be used either by compilers or programmers, who can implement it manually or with a spreadsheet. FIG. 5 illustrates a plurality of influence tables relative to RIS=1, 2, and 3 for an example asymmetric, 5-point 2D stencil operator, according to an embodiment of the invention. In particular, FIG. 5 illustrates an asymmetric, 5-point 2D stencil operator $O^1$ 500, an exemplary initial domain of data points 502, a first influence table 504, a second influence table 506 and a third influence table 508, which are generated based on the asymmetric, 5-point 2D stencil operator $O^1$ 500. In FIG. 5, the shaded cells (peripheral cells) in the illustrative representations of the domain 502 and influence tables 504, 506 and 508 represent a "ghost region". Moreover, in the illustrative representations of the influence tables 504, 506 and 508, the empty cells include zero's (0), which are omitted for clarify.

To generate the influence tables 504, 506 and 508, we start with the exemplary initial domain of data points 502, wherein one element has value 1 (e.g., the data point in the center of the domain 502). The stencil operator 500 is applied to every domain point in the initial domain of data points 502 to generate the first influence table 504 relative to RIS=1. It is to be noted that influence table 504 relative to RIS=1 comprises the original stencil operator $O^1$ 500 flipped in both dimensions (vertically and horizontally) and centered at the only point that had value 1 at T=0 (as could have been predicted by Corollary 1B). Next, the original stencil operator 500 is applied to every point in the first influence table 504 to generate the second influence table 506 relative to RIS=2. Further, the original stencil operator 500 is applied to every point in the second influence table 506 to generate the third influence table 508 relative to RIS=3. Likewise, the influence table 508 relative to T=3 is a flipped representation of $O^3$. It is to be appreciated that Influence Tables can also be used for 1D and 3D stencils. The benefits of utilizing Influence Tables will be explained in further detail below.

Computation Reuse and Intrinsics of 3D ASLI

The embodiments discussed so far relate to ASLI with a 1D stencil and the Influence Table with a 2D stencil. Now we use a 3D stencil to show the new data reuse possibilities and an implementation in C programming language. First, consider a symmetric 3D stencil of 7 points, such as:

$$out(x,y,z)=k_0*in(x,y,z)+k_1[in(x\pm1,y,z)+in(x,y\pm1,z)+in(x,y,z\pm1)]$$

Figure 6:
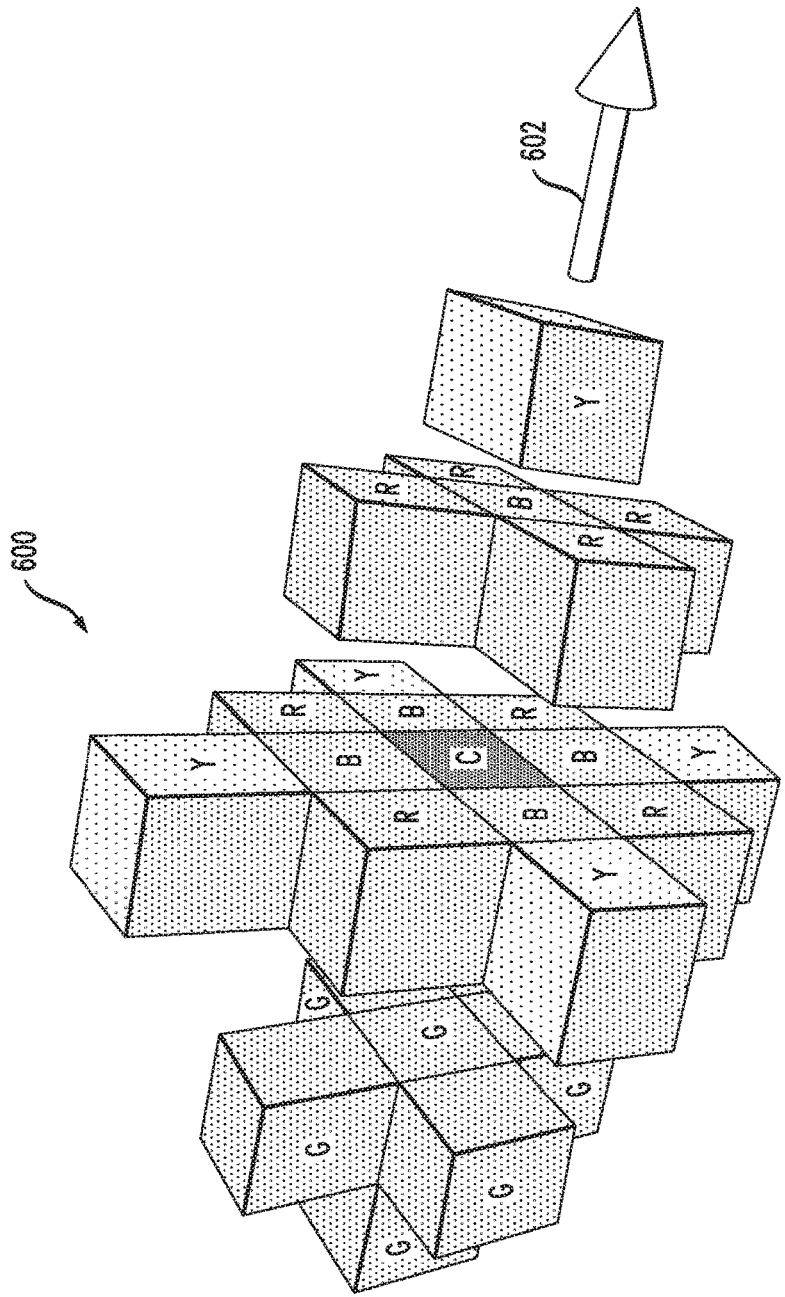
FIG. 6 is a schematic 3D representation of performing a ASLI computation process for RIS=2 based on a 3D, 7-point stencil operator, according to an embodiment of the invention.

Based on the notation utilized above, the symmetric 3D stencil of 7 points would have $c_{(0,0,0)}=k_0$ and $c_{(\pm1,0,0)}=c_{(0,\pm1,0)}=c_{(0,0,\pm1)}=k_0$. When computed with kernel convolution through ASLI, the original 3D, 7-point stencil requires information from 25 points per calculation as shown in FIG. 6. In particular, FIG. 6 is a schematic 3D representation of performing a ASLI computation process for RIS2 based on a 3D, 7 point stencil operator, according to an embodiment of the invention. The process depicted in FIG. 6 illustrates reuse of intermediate computations. For example, in the example embodiment of FIG. 6, the points of the same color (yellow (Y), red (R), and blue (B)) share the same convolved coefficient and represent computation that remains to be done. The green (G) points represent multiplications and additions that have already been performed, in the current time-step iteration, when a computation wave front (in a direction denoted by arrow 602) reaches a current point (C) show in FIG. 6. The result of such computations may reside in an intermediate variable, at the discretion of the programmer. Additionally, as the stencil domain is being traversed in the wave front direction 602, only 13 points need to be explicitly loaded by the kernel, namely the red (R) and yellow (Y) points.

If implemented with ASLI, an innermost loop of the stencil would look like Listing 1 below. Note the variables necessary to implement the data reuse. The variables are the vectors axis, of five elements and ring of three elements. This vector ring is not to be confused with the outermost ring, which offers no computation reuse. The convolved coefficients in Listing 1 are $e_{00}=k_0^2+6k_1^2$ (for the current (C) point), $e_{01}=2k_0k_1$ (for the five blue (B) points), $e_{11}=2k_1^2$ (for the eight red (R) points), and $e_{02}=k_1^2$ (for the five yellow (Y) points), as shown in FIG. 6. In this particular example, the computation could be reused without any additional multiplication. In asymmetric cases, an additional multiplication is usually necessary, as in a 2D example which will be explained in further detail below with reference to FIG. 5. Such reuses can also be addressed as "(computation) wave front reuse".

The following Listing 1 shows an example computation of the innermost loop of a 3D 7-point ASLI with RIS of 2, as depicted in FIG. 6:

```
1 int col=ghost radius;
2 for (w=0; w<W; w++, col++){
4 // 1 READ, right-hand yellow point
5 axis[0]=axis[1]; axis[1]=axis[2];
6 axis[2]=axis[3]; axis[3]=axis[4];
7 axis[4]=in[d][row][col+2];
9 // 4 READS, four right-hand, red points
10 ring[0]=ring[1]; ring[1]=ring[2];
11 ring[2]=e11*(
12 in[d-1] [row] [col+1]+in[d] [row+1] [col+1]
13 +in[d][row-1][col+1]+in[d+1][row][col+1]);
14
15 // 8 READS, outermost ring, four remaining
yellow and red points
16 om=e02*(in[d+2][row][col]+in[d][row+2][col]
17 +in[d-2][row][col]+in[d][row-2][col]);
18 om+=e01*(in[d+1][row+1][col]+in[d+1][row-1][col]
19 +in[d-1][row+1][col]+in[d+1][row-1][col]);
20
```

```
21 // Final Computation
22 out [d] [row] [col]=e00*axis[2]
23 +e01*(axis[1]+axis[3])
24 +e02*(axis[4]+axis[0])
25 +ring[0]+ring[2]+(e01/e11)*ring[1];
26 +om;
27}
```

More Properties of ASLI Operators

A. Patterns in Asymmetry

We have previously demonstrated the benefits of applying ASLI to symmetric cases. The question that arises is whether the approach would be beneficial with asymmetric stencil operators. We show that in such a case, ASLI can be more advantageous than when applied to symmetric operators. We will consider the Influence Table 508 of ASLI with RIS=3 applied to a 2D, 5-point completely asymmetric stencil 500, as shown in FIG. 5. A striking property that can be seen in the Influence Table 508 relative to RIS=3 in FIG. 5 is that column 2 (COL#2, FIG. 5) is a multiple of column 6, that is:

$$col_2=[2541,726,1815]^T=13.44\times[189,54,135]^T=13.44\times col_6.$$

The same holds, with a different multiplier, between the pair of columns $col_3$ and $col_5$. This is a general and useful property. Now let P(K, R) denote the pair of coefficients, along column $col_K$, apart R cells from the central row $r_4$. For example, P(6, 1)={189, 135}. Then we see that P(5, 1)=1.33×P(6, 1) and that P(4, 1)=11.66×P(6, 1) Also, P(4, 2)=0.66×P(5, 2). That is, the pair of coefficients [294, 150] of column $col_4$ can be obtained from the pair of coefficients [441, 225] of column $col_5$ by multiplying $col_5$ by 0:66.

Each of these last three identities allows us to reduce for each pair 4 FLOPs (one Mul and one Add for each element of the pair) to 2 FLOPs (one Mul of the summation, previously computed, of the elements of the original pair, followed by an Add). Additionally, the fact that $col_2$ and $col_3$ can be obtained from $col_5$ and $col_6$ allows us to reduce what would be, respectively, 6 FLOPs and 10 FLOPs (Mul and Add for every element in the column) to 2 FLOPs and 2 FLOPs (Mul and Add of the previous summation of every element in each column). Now, it can be seen in FIG. 5 that the kernel convolved operator $O^3$ has 25 points (the non-blank cells) accounting for potentially 49 FLOPs. Therefore, for this completely asymmetric case, we can save 18 FLOPs with reuse of computation. Then, the total FLOPs for 2D ASLI of radius 1, with RIS=3, is 31. The straightforward stencil would require, for 3 iterations, 3×9=27 FLOPs, which produces a FLOPs ratio of 27/31≈0.87. At first glance, a FLOPs ratio smaller than 1 would reflect a "speed-down". However, because of the enhanced memory access and SIMD'zation properties, the transformed kernel actually executes faster.

B. High-Order Operators in a 2D Case

Let us consider a symmetric stencil operator (e.g., 4-way symmetric), such as: out(x, y)=$k_0$*in(x, y)+$\Sigma_{R=1}^{K}k_R$*[in (x±R, y)+in(x, y±R), where $k_R$ is a coefficient applied to the four neighboring points that are at a distance R from a central point. The operator is said to have radius W and a total of 1+4W points. The operator has W quadruplets, each requiring 3 Adds among the four elements, a following Mul, and a final Add. The central point needs one Mul, because the other intermediate calculations are added to it. After T iterations, the amount of FLOPs performed is FLOP(4 way; T)=(1+5W)T FLOPs.

Figure 7:
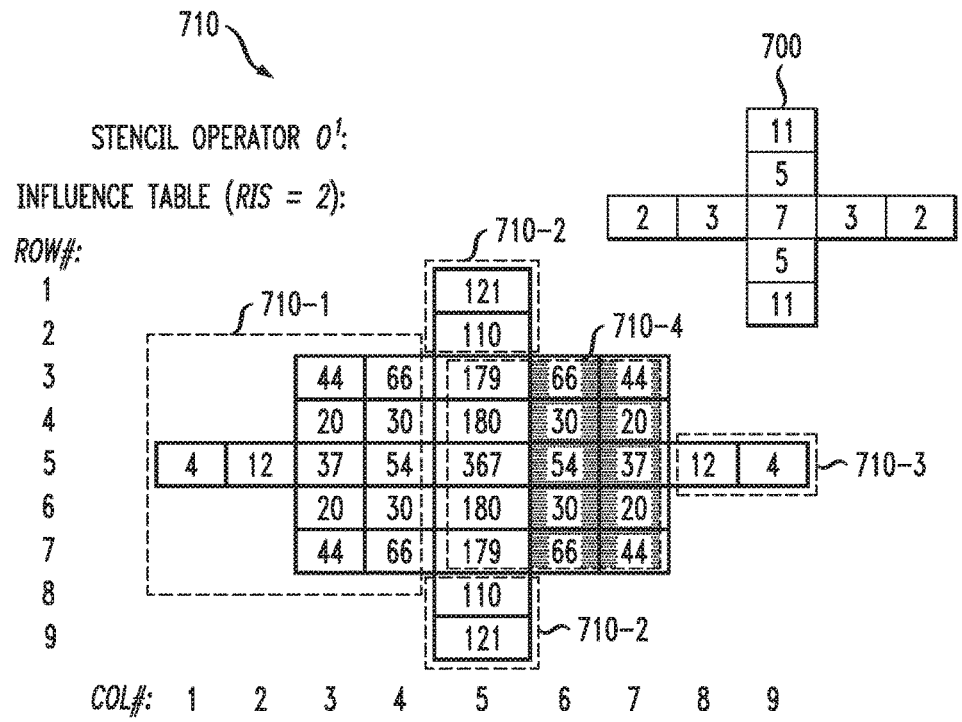
FIG. 7 illustrates a 2-way symmetric stencil operator 700 and corresponding influence table 710 according to an embodiment of the invention.

Now let us consider an asymmetric stencil operator (as shown in FIG. 7) which is said to have 2-way symmetry. FIG. 7 illustrates a 2-way symmetric stencil operator 700 (e.g., symmetric along both axes) and corresponding influence table 710 (or convolved operator $O^2$) according to an embodiment of the invention. The operator 700 has W vertical pairs of coefficients (11 and 5) as well as W horizontal pairs (2,3). Each of the two W pairs requires 1 Add between its elements, 1 Mul of this partial result, and another 1 Add. Again, the central element requires just 1 Mul. We thus have FLOP(2 way; 1)=1+2 W pairs×(3 FLOPs), and FLOP(2 way; T)=(1+6W)T.

To count the FLOPs of a 2-way symmetric ASLI with RIS=2 and radius=W, consider the convolved operator $O^2$ 710 of FIG. 7 that can be divided into four parts: part (1)—the four left columns (cells included in 710-1); part (2)—the upper and lower arms (cells included in 710-1 with coefficients 121 and 110); part (3)—the right arm (cells included in 710-3); and part (4)—the right main body (cells included in 710-4) composed of the 15 cells delimited by rows 3 and 7 and columns 5 and 7. Using wave front reuse, we see that for the twelve elements in part (1), just 2W Adds are needed. An additional 3W FLOPs are needed to compute the W pairs that arise when the upper and lower arms are analyzed together. The right arm needs 2W FLOPs (one Mul and one Add, per coefficient). By now, just the fifteen coefficients in the right main body (4) remain to be accounted for.

In part (4), the three elements along row 5 (in the example, 367, 54, and 37) contribute 1+2W FLOPs. Each of the W rightmost pairs of the computation wave front, i.e., the two pairs P(7,1) and P(7,2) (FIG. 7, cells in row 7, excluding 37), contribute 3 FLOPs, for a total of 3W FLOPs. Along the central column (column 5) there are other W pairs that can be accounted for with an Add, Mul, and Add, totaling 3W FLOPs. In the right main body, W−1 columns remain to be considered. That is, in FIG. 7, just the four cells in column 6 (66, 30, 30, 66) remain to be analyzed. The W−1 columns can be dealt with by just considering that each has W pairs. To realize this fact, it is to be noted that in FIG. 7 the multiplier m from P(6, 1)=mP(7, 1) is the same multiplier from P(6, 2)=mP(7, 2). In the example, [66, 30, 30, 66]$^T$=1.5×[44, 20, 20, 44]$^T$. In other words, except for coefficients in the central row, the contribution of each of the remaining W−1 columns can be calculated, with wave front reuse, with one Mul and one Add, for a total of 2(W−1) FLOPs. Without wave front reuse, this would have accounted for quadratic 3W(W−1) FLOPs.

By summing together the individual contributions of parts (1)-(4), we obtain FLOPs (ASLI, 2D, r=W, RIS=2, 2- or 4-way symmetric)=17W+1. The following Table I summarizes this information:

TABLE I

FLOPS OF OPERATORS FOR 2D STENCIL KERNELS, VARYING THE SYMMETRY. STR.FW. STANDS FOR STRAIGHTFORWARD.

|  |  | Radius: | 2 | 3 | 4 | 5 | 6 |
|---|---|---|---|---|---|---|---|
| FLOPs | Str.fw., 4-way sym. |  | 22 | 32 | 42 | 52 | 62 |
|  | Str.fw., 2-way sym. |  | 26 | 38 | 50 | 62 | 74 |
|  | ASLI, RIS = 2 |  | 33 | 50 | 67 | 84 | 101 |
| FLOPs Ratio | Str.fw., 4-way sym. |  | 0.67 | 0.64 | 0.63 | 0.62 | 0.61 |
|  | Str.fw., 2-way sym. |  | 0.79 | 0.76 | 0.75 | 0.74 | 0.73 |

There is a limit to the ratio of FLOPs performed by a conventional implementation of stencil computation and a corresponding ASLI version of the stencil computation. Table 1 also shows that for the 2-way symmetric operator of FIG. 7, ASLI can be beneficial if it helps improve the interaction of the program with the memory subsystem by a factor S for which S×0.79>1, or S≥1.26. Our experimental results show that, while ASLI may increase the total FLOPs in 2D and 3D cases, the ASLI protocol results in significantly shorter time to solution.

To characterize ASLI in best case scenarios, we distinguish two cases with respect to interaction with a memory subsystem—Case 1 (entire domain fits in L1 Cache) and Case 2 (domain is larger than cache).

Case 1:

In kernel-convolved schemes, more data points are needed per iteration. Because ASLI always restructures the innermost loop, with regard to ASLI kernels, we refer to kernels that reuse the values previously loaded to the register files while traversing the fastest varying dimension. For example, 1D ASLI kernels have just one explicit load of the rightmost point. Let us assume that T time-steps must be performed in a 1D domain of N elements with a reduction in iteration space of 2 (RIS=2). The related ASLI kernel has to go through the domain NT/RIS=NT/2 times and performs 7 FLOPs at each point as $X_{i,t+2} = e_0 * X_{i,t} + e_1 * (X_{i-1,t} + X_{i+1,t}) + e_2 * (X_{i-2,t} + X_{i+2,t})$, where the $e_a$'s denote the new, convolved stencil coefficients. The total FLOPs through time is now 7NT/2=3.5NT. A straightforward implementation requires 4 FLOPs per point, or 4NT in total. Because the problem fits in L1, the tradeoff between memory access and computation is irrelevant. Still, there is a possible 4NT/3.5NT=1.14 speed-up over the best possible straightforward implementation (the theoretical limit of this speed-up for the 1D, 3-point symmetric stencil is 1.33). Of course, this assumes that cache latencies, register dependencies, and other undesired inefficiencies are dealt with. This means that if both kernels achieve peak floating-point performance, ASLI is faster, as it has fewer computations to perform. The exploitation of such speed-up might be constrained by potential Add/Mul imbalances where, for example, the architecture provides fused multiply-add or two separate units for Add and Mul.

Case 2:

ASLI can change stencil computation characteristics in three areas: (a) the amount of equivalent stencils per iteration, (b) the FLOPs to bytes ratio, and (c) the FLOPs to equivalent stencils ratio. ALSI is designed to increase (a). For 1D, 2D, and 3D, ALSI always increases (b). For 1D, it decreases (c). However, for 2D and 3D, ALSI actually increases (c). In a machine with a perfect memory subsystem or in the case that all latency is hidden, ASLI would not be beneficial for 2D and 3D. But, again, experimental results show that 3D ASLI is beneficial even for the in-cache performance. ASLI works to cut the total main memory traffic by a factor of RIS, being most beneficial in applications that are purely memory-bound. This fact allows us to draw two related corollaries.

Corollary 2—It follows that for strided access and for languages with more overhead like Python and Java, kernel convolution pays off more naturally and the speedup achievable through kernel convolution is more likely to approach RIS. In such scenarios, more unnecessary bytes are brought from the main memory to cache, as the stride transfers unnecessary data in the same cache-line as necessary data.

Corollary 2b—In such scenarios, it is also more likely that the convolution of more complex calculations pays off more naturally.

Characterization for 1D

Straightforward and ASLI versions of stencil kernels are represented in each row of Table II shown in FIG. 10.

Table II illustrates characteristics of some ASLI schemes for 1D, 2D, and 3D symmetric stencils. Each line in the Table II represents a Kernel. The lines with RIS=1 represent a naïve implementation. Speed-ups achievable in two hypothetical machines are shown. The operational intensities assume a compulsory main memory traffic of 16B generated by each double precision (DB) calculation. The line within a dashed box shown in FIG. 10 represents a Kernel version that would be compute bound.

The first three columns define the kernel configuration. Any row with RIS=1 represents a conventional kernel, and therefore the corresponding kernel has FLOPs Ratio=1. The information to calculate the FLOPs Ratio is found in the 4th and 5th columns. These columns show that the 3D ASLI of RIS=2 performs 24 FLOPs to obtain the same result that a straightforward implementation would obtain with 16 FLOPs, resulting in FLOPs Ratio=16/24≈0.67.

The 7th column (Cache Reads) shows that the Kernel of the 1st row has 3 cache reads (or explicit loads). This row represents the most straightforward kernel. The 2nd row features 1 explicit load. This row represents a straightforward kernel that applies the principle of computation wave front reuse. Such kernel brings just one new data value from the caches to the register files per iteration of the innermost loop. Recall that in the 1D case such reuse is that of individual points. The kernel with wave front reuse (2nd row) has higher arithmetic intensity than the most straightforward (1st row), as it diminishes the interaction between processors and caches. Both schemes have the same operational intensity, as both traverse the whole domain the same amount of time. When analyzing operational intensity and related compulsory bytes exchanged with the main memory, domains larger than the last cache level should be considered.

The last four columns in Table II represent a limit to achievable performance on two types of machine specified by the double precision (DP) peak performance and the bandwidth (BW). The columns labeled Roofline show the MIN(operational intensity×BW; DP peak performance) and represent the peak performance achievable by the related kernel in best case scenarios. The columns labeled Speedup Achievable show the product of FLOPs Ratio by the ratio Roofline(kernel)/Roofline(straightforward). Until breaking the memory-boundedness zone, the benefit a kernel would get with the FLOPs Ratio is actually irrelevant, and the combined speedup comes solely from the degree of the kernel convolution (i.e., RIS). This phenomenon is better appreciated when analyzing the last row of 1D kernels in Table II (i.e., the line within the dashed box shown in FIG. 10), as in this case the kernel would be able to achieve peak DP in Machine 2, but not in Machine 1.

Characterization for 2D and 3D

For the 2D and 3D cases, ASLI results in FLOPsRatio<1. This means that the 2D, radius 1, RIS=2 kernel would not perform better than a given straightforward implementation that reaches 80% of peak performance. However, in practice 2D stencils are far from achieving 80% of peak performance. In the memory-bounded zone, the FLOPs Ratio is irrelevant for the achievable theoretical speed-up, and a kernel would benefit from ASLI. There are some well-known approaches to address the low operational intensity of stencil codes. Time-skewing is one interesting approach and especially useful for 1D stencils. For brevity, we do not compare ASLI with time-skewing. We do note that for 2D and 3D cases, such approaches will be parameterized to fit the L2 cache (or last level cache). Because the L2 (or last level) cache latency is still much higher than L1 latency (often around at least 10× or more), a blind application of time-skewing still incurs many wasted cycles with L2 (or last cache level) stalls. This is obviously the case for a blind application of ASLI as well, but note that ASLI works to cut such wasted cycles by a factor of RIS. Such practical aspects are usually overlooked when discussing "best case scenarios". To conclude, ASLI can be time-skewed and applied in synergy with most existing techniques.

Figure 8:
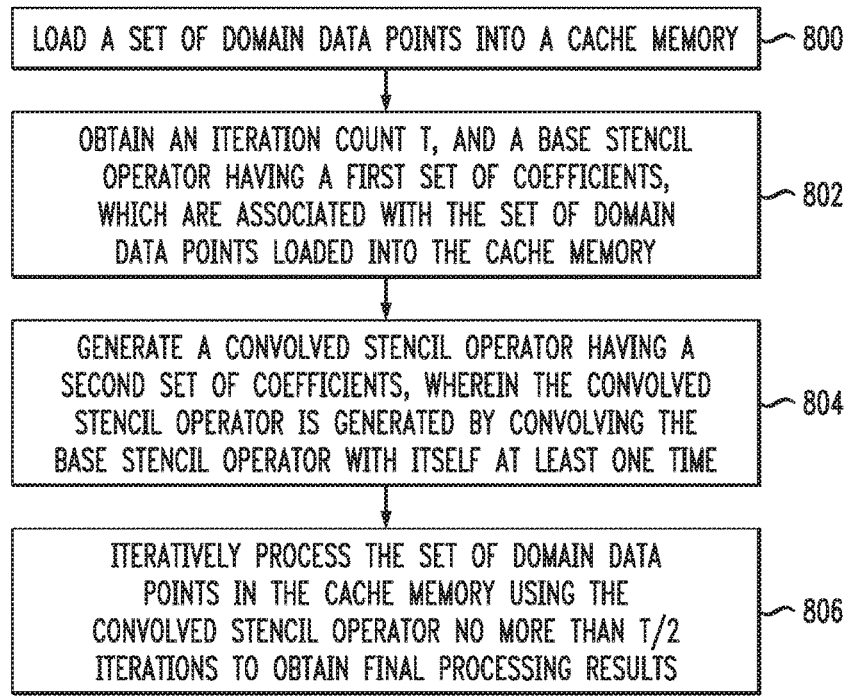
FIG. 8 is a flowchart of a method for performing a stencil computation, according to an embodiment of the invention.

FIG. 8 is a flowchart of a method for performing a stencil computation, according to an embodiment of the invention. In particular, FIG. 8 depicts a high-level process flow representative of various ASLI techniques as discussed herein. Referring to FIG. 8, an initial step in the process flow comprises loading a set of domain data points into a cache memory, wherein the set of domain points comprises N data points (block 800). A next step comprises obtaining an iteration count T, and a first data structure comprising a base stencil operator having a first set of coefficients, which are associated with the set of domain data points loaded into the cache memory (block 802). A next step comprises generating a second data structure comprising a convolved stencil operator having a second set of coefficients, wherein the convolved stencil operator is generated by convolving the base stencil operator with itself at least one time (block 804). A next step comprises iteratively processing, by a processor, the set of domain data points in the cache memory using the convolved stencil operator no more than T/2 iterations to obtain final processing results (block 806). The final processing results that are obtained are similar to processing results that would be obtained by iteratively processing the set of domain data points in the cache memory using the base stencil operator for the iteration count T.

More specifically, in one embodiment of the invention, the stencil computation of FIG. 8 is performed as follows. The initial set of N domain points are loaded into a first region of system memory (e.g., RAM). For example, as discussed above, FIG. 2B shows an example embodiment in which the initial set of N domain points 200 is stored in a first region of system memory. To perform a first iteration of stencil computations on the initial set of N domain points 200, at least a subset of the initial N domain points 200 is loaded into a cache memory (e.g., L1 or L2 cache) for fast access by a processor (e.g., CPU). Depending on the size of the cache memory and/or the size of the set of N domain points 200, the entire set of N domain points 200, or a subset of the N domain points 200 is loaded into the cache memory at a given time.

The entire set (or subset) of the N domain data points 200 loaded in the cache memory is then processed by performing stencil computations using the convolved stencil operator, and the processing results for the given set (or subset) of the N domain points in the cache memory are written to a second region of the system memory. Thereafter, additional subsets of the initial set of N domain points 200 in the first region of system memory are sequentially loaded into the cache memory and processed using the convolved stencil operator, with the processing results for the first iteration of stencil computations being saved each time to the second region of system memory. At the completion of the first iteration of stencil computations, the entire set of the N computed domain points 202B resulting from the first iteration of stencil computations will reside in the second region of system memory, as shown in FIG. 2B. This process is then repeated to perform a second iteration of stencil computations over the entire set of the N computed domain points 202B using the convolved stencil operator, with the processing results 204B of the second iteration of stencil computations being stored in the first region of system memory, overwriting the initial set of N domain points 200 initially loaded into the first region of system memory. The process is repeated for T/2 iterations.

The data processing techniques as discussed here provide various advantages. For example, the data processing techniques enable more data reuse, wherein more operations are performed each time a data value is loaded from memory, thus enhancing performance. In addition, the data processing techniques enable more reuse of sub-expressions. If constants are mirrored in at least one direction, intermediate computations can be reused. Moreover, fewer memory accesses are needed—the domain is traversed fewer times, but for each point we may need to load more data. Ultimately, the total number of memory accesses depends on the neighborhood geometry, the symmetry of the constants, and the register spills of the specific method embodiment. Furthermore, the data processing methods provide reduced communication overhead, e.g., in each iteration of an ASLI method, we perform the equivalent computation of multiple steps (e.g., at least two iterations), thus reducing communication overhead, and thereby providing a faster time to solution.

In summary, embodiments of the invention include Kernel convolution (KC) techniques based on data reuse. The techniques discussed herein attempts to increase the amount of useful work performed on the data loaded into caches and register files. One possible application of KC to stencil is through ASLI, although KC techniques of the invention are not confined to the stencil domain. For example, assume there are two computations A and B that must be applied to a domain. These computations can be convolved into D=A∘B. In the cases described herein, a desired reduction in iteration space (RIS) is achieved when the computation uses, instead of the original stencil operator $O^1$, the convolved operator $O^{RIS}=O^1 \circ O^1 \ldots$ where $O^1$ figures RIS times in the right-hand side of the previous definition. Kernel characteristics of 1D, 2D, and 3D ASLI were discussed, wherein we have shown how to apply computation reuse with asymmetric and high-order 2D convolved operators. In the 1D case, ASLI results in fewer FLOPs than a naive implementation. For the 2D and 3D cases, ASLI results in more FLOPs. The technique does pay off because it enhances the computation to load ratio and requires fewer loads and stores. Additionally, ASLI allows to better exploit SIMD units and hide latencies and register dependency, besides being communication-avoiding.

ASLI can be applied by the scientific community to a range of applications in a wide range of languages and environments. The more overhead the language and the environment add to the underlying computation, the better the speed-up that is achieved. KC and ASLI make the optimization more straightforward for scientists not directly involved in optimizing. Other techniques and solutions are often discouraging, as they usually require specialized compilers or more complex infrastructure. Automated approaches and compiler techniques to apply KC could benefit from a notation that better allows the discovery of dependencies in workflows of computation. In this scenario, the Influence Table was introduced to aid programmers and compiler developers. The Influence Table can also be used to analyze other kinds of computations. In the road to exaflop, new algorithms and paradigms have a role to play. We believe that ASLI, and kernel convolution in general, work in such a direction. In this scenario, 1D ASLI is the paragon, as its FLOPs Ratio allows to achieve a time to solution faster than a hypothetical straightforward implementation could get with 100% peak floating-point performance.

Embodiments of the invention include a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Embodiments of the invention are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

These concepts are illustrated with reference to FIG. 9, which shows a computing node 10 comprising a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

Figure 9:
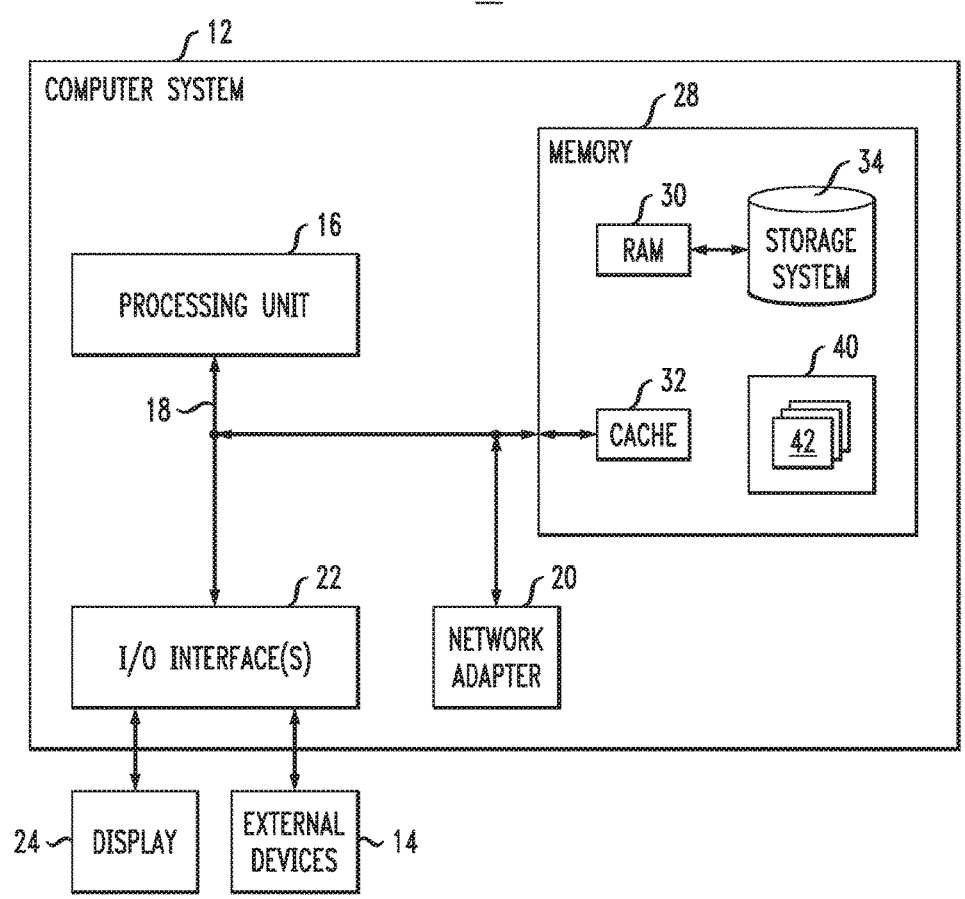
FIG. 9 illustrates a computer system that may be used to implement one or more components/steps of the techniques of the invention, according to an embodiment of the invention.

In FIG. 9, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 12 typically includes a variety of computer system readable media. Such media may be any available media that is accessible by computer system/server 12, and it includes both volatile and non-volatile media, removable and non-removable media.

The system memory 28 can include computer system readable media in the form of volatile memory, such as random access memory (RAM) 30 and/or cache memory 32. The computer system/server 12 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As depicted and described herein, memory 28 may include at least one program product having a set (e.g., at least one) of program modules that are configured to carry out the functions of embodiments of the invention.

The program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12, and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Although exemplary embodiments have been described herein with reference to the accompanying figures, it is to be understood that the invention is not limited to those precise embodiments, and that various other changes and modifications may be made therein by one skilled in the art without departing from the scope of the appended claims.

What is claimed is:

1. A method, comprising:
    loading a set of domain data points into a cache memory, wherein the set of domain points comprises N data points;
    obtaining an iteration count T, and a first data structure comprising a base stencil operator having a first set of coefficients;
    generating a second data structure comprising a convolved stencil operator having a second set of coefficients, wherein the convolved stencil operator is generated by convolving the base stencil operator with itself at least one time; and
    iteratively processing, by a processor, the set of domain data points in the cache memory using the convolved stencil operator no more than T/2 iterations to obtain final processing results;
    wherein the final processing results that are obtained are similar to processing results that would be obtained by iteratively processing the set of domain data points in the cache memory using the base stencil operator for the iteration count T.

2. The method of claim 1, wherein iteratively processing comprises:

storing intermediate processing results in one or more register files associated with the processor, which are computed from at least one iteration; and reusing the intermediate processing results stored in the one or more register files to perform computations of a subsequent iteration.

3. The method of claim 2, wherein at least one intermediate processing results stored in at least one register file associated with the processor comprises a multiplication result obtained by the processor applying a coefficient of the convolved stencil operator to a data point.

4. The method of claim 2, wherein at least one intermediate processing results stored in at least one register file associated with the processor comprises a summation result obtained by the processor summing at least two products obtained by applying at least two coefficients of the convolved stencil operator to at least two data points, respectively.

5. The method of claim 1, wherein the convolved stencil operator comprises a symmetric pattern of coefficients, wherein coefficient values for portions of the second set of coefficients are the same.

6. The method of claim 1, wherein the convolved stencil operator comprises an asymmetric pattern of coefficients, wherein coefficient values for at least a first portion of the second set of coefficients are multiples of at least a second portion of the second set of coefficients.

7. The method of claim 1, wherein the N set of data points comprises a uni-dimensional array, and wherein the convolved stencil operator comprises a 1D pattern of coefficients.

8. The method of claim 1, wherein the N set of data points comprises a multi-dimensional array, and wherein the convolved stencil operator comprises a multi-dimensional pattern of coefficients.

9. The method of claim 1, wherein the method is implemented by a compiler.

10. An article of manufacture comprising a computer readable storage medium having program instructions embodied therewith, the program instructions executable by a computer to cause the computer to perform a method comprising:

loading a set of domain data points into a cache memory, wherein the set of domain points comprises N data points;

obtaining an iteration count T, and a first data structure comprising a base stencil operator having a first set of coefficients;

generating a second data structure comprising a convolved stencil operator having a second set of coefficients, wherein the convolved stencil operator is generated by convolving the base stencil operator with itself at least one time; and iteratively processing, by a processor, the set of domain data points in the cache memory using the convolved stencil operator no more than T/2 iterations to obtain final processing results;

wherein the final processing results that are obtained are similar to processing results that would be obtained by iteratively processing the set of domain data points in the cache memory using the base stencil operator for the iteration count T.

11. The article of manufacture of claim 10, wherein iteratively processing comprises:

storing intermediate processing results in one or more register files associated with the processor, which are computed from at least one iteration; and reusing the intermediate processing results stored in the one or more register files to perform computations of a subsequent iteration.

12. The article of manufacture of claim 11, wherein at least one intermediate processing results stored in at least one register file associated with the processor comprises a multiplication result obtained by the processor applying a coefficient of the convolved stencil operator to a data point.

13. The article of manufacture of claim 11, wherein at least one intermediate processing results stored in at least one register file associated with the processor comprises a summation result obtained by the processor summing at least two products obtained by applying at least two coefficients of the convolved stencil operator to at least two data points, respectively.

14. The article of manufacture of claim 10, wherein the convolved stencil operator comprises a symmetric pattern of coefficients, wherein coefficient values for portions of the second set of coefficients are the same.

15. The article of manufacture of claim 10, wherein the convolved stencil operator comprises an asymmetric pattern of coefficients, wherein coefficient values for at least a first portion of the second set of coefficients are multiples of at least a second portion of the second set of coefficients.

16. An apparatus comprising:

a cache memory; and a processor comprising register files, wherein the processor is configured to execute program instructions to implement a method which comprises:

loading a set of domain data points into the cache memory, wherein the set of domain points comprises N data points;

obtaining an iteration count T, and a first data structure comprising a base stencil operator having a first set of coefficients;

generating a second data structure comprising a convolved stencil operator having a second set of coefficients, wherein the convolved stencil operator is generated by convolving the base stencil operator with itself at least one time; and iteratively processing the set of domain data points in the cache memory using the convolved stencil operator no more than T/2 iterations to obtain final processing results;

wherein the final processing results that are obtained are similar to processing results that would be obtained by iteratively processing the set of domain data points in the cache memory using the base stencil operator for the iteration count T.

17. The apparatus of claim 16, wherein iteratively processing comprises:

storing intermediate processing results in a register file of the processor, which are computed from at least one iteration; and reusing the intermediate processing results stored in the register file to perform computations of a subsequent iteration.

18. The apparatus of claim 17, wherein at least one intermediate processing results stored in at least one register file associated with the processor comprises a multiplication result obtained by the processor applying a coefficient of the convolved stencil operator to a data point; and wherein at least one intermediate processing results stored in at least one register file associated with the processor comprises a summation result obtained by the processor summing at least two products obtained by applying at least two coefficients of the convolved stencil operator to at least two data points, respectively.

19. The apparatus of claim 16, wherein the convolved stencil operator comprises a symmetric pattern of coefficients, wherein coefficient values for portions of the second set of coefficients are the same.

20. The apparatus of claim 16, wherein the convolved stencil operator comprises an asymmetric pattern of coefficients, wherein coefficient values for at least a first portion of the second set of coefficients are multiples of at least a second portion of the second set of coefficients.

* * * * *